Oct. 8, 1946.  W. P. LEAR  2,409,132
REELING MECHANISM
Filed Oct. 19, 1943  3 Sheets-Sheet 1

INVENTOR.
WILLIAM P. LEAR
BY
Richard A. Marsan
ATTORNEY

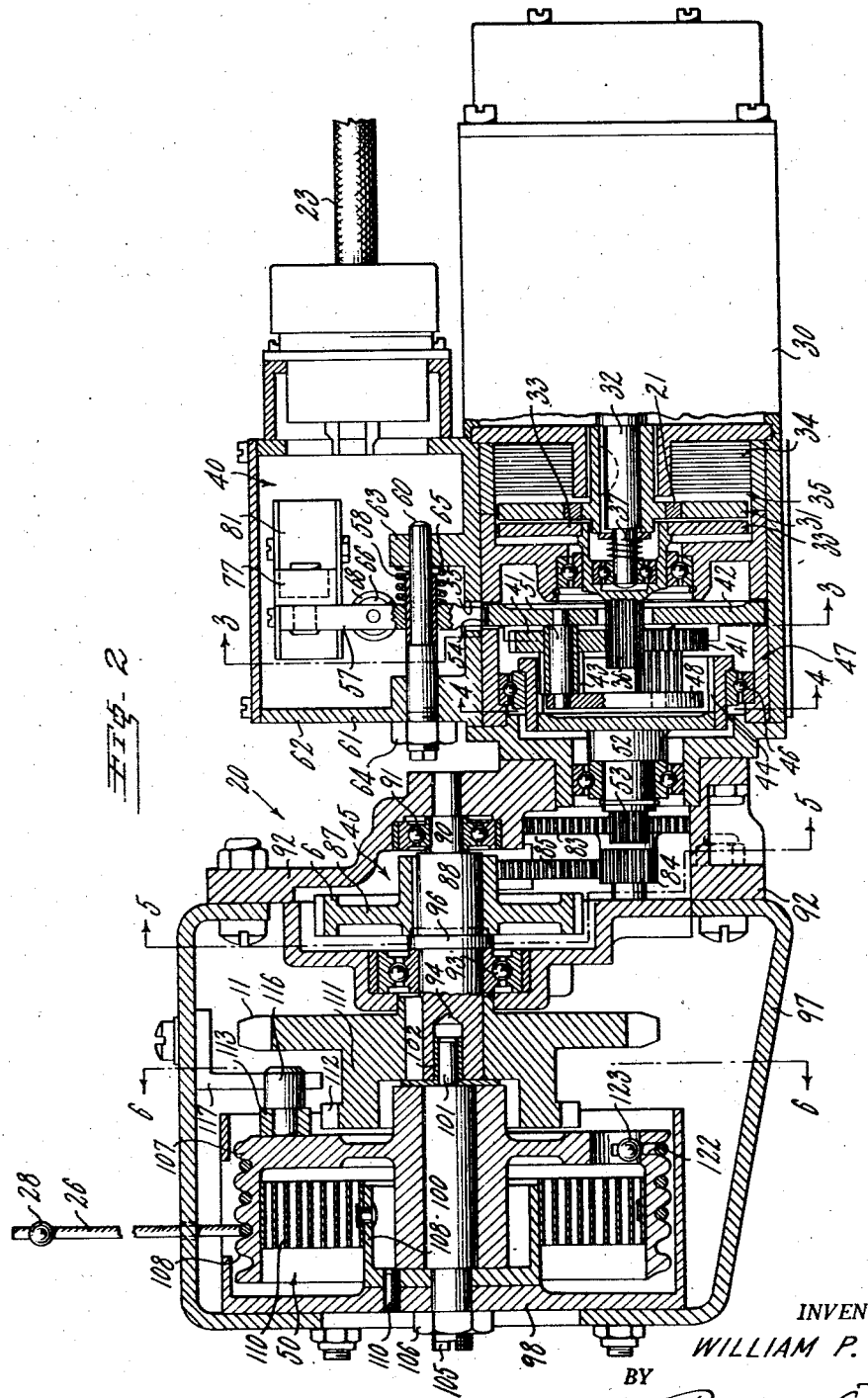

Oct. 8, 1946.  W. P. LEAR  2,409,132
REELING MECHANISM
Filed Oct. 19, 1943  3 Sheets-Sheet 3
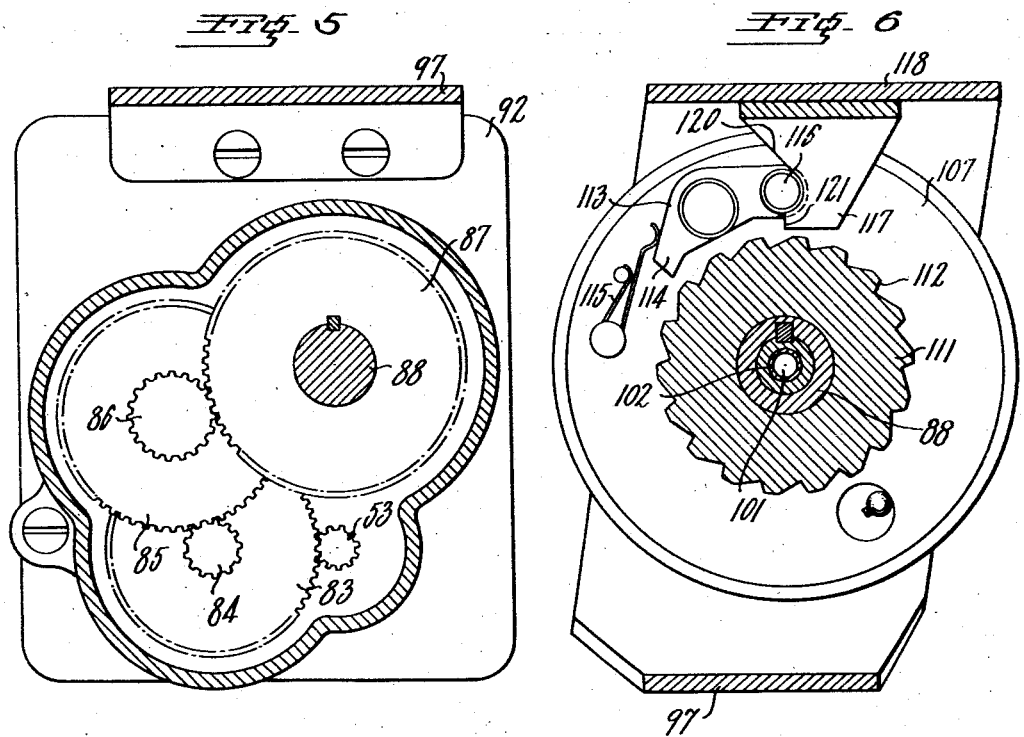
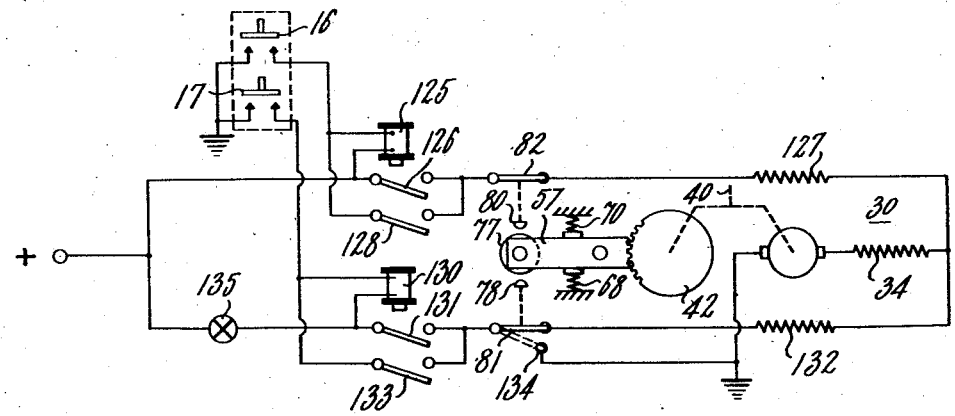
INVENTOR.
WILLIAM P. LEAR
BY Richard A. Marsen
ATTORNEY Patented Oct. 8, 1946

2,409,132

UNITED STATES PATENT OFFICE 2,409,132

REELING MECHANISM

William P. Lear, North Hollywood, Calif., assignor, by mesne assignments, to Lear, Incorporated, Grand Rapids, Mich., a corporation of Illinois Application October 19, 1943, Serial No. 506,796

9 Claims. (Cl. 244—110)

This invention relates to novel mechanical actuator devices, and more particularly to mechanically and manually actuable apparatus for extending and retracting the landing hook of a carrier based airplane.

The invention is particularly directed to an actuator for moving a member between a pair of limiting points, with means for stopping motion of the actuator when the member reaches either of the limiting points. Hitherto, this has generally been accomplished by means of electric limit switches which require skilled and accurate setting in order to insure proper functioning at the exact limiting point. In case of any improper setting of the limit switches, damage to the elements of the actuator might occur from shock or impact due to the member overrunning the limiting points. With the present invention, a device is provided which automatically stops motion of the actuator when the movable member reaches either limiting point, through the increased torque exerted by the actuator power drive means by reason of the member reaching such limiting point.

The invention is capable of general application, but is more particularly applicable to a rotary actuator for operating the arresting gear or landing hook of carrier based aircraft. Carrier based military aircraft are generally equipped with arresting gear, such as an extendible hook, which, when the aircraft is landing on the deck of a carrier is adapted to grip a suitable landing device, such as a cable, to rapidly arrest forward motion of the aircraft on the deck. Such provision is generally necessary in view of the relatively high landing speeds of such military aircraft, as compared with the relatively short length of the flight deck.

It is among the objects of this invention to provide mechanism for moving a member between a pair of limiting points and including a device automatically effective when the movable member reaches either of such points to stop motion to the mechanism; to provide an actuator for moving a member between a pair of limiting points, and including an electric motor and a torque responsive device effective automatically to deenergize said motor when the movable member reaches either of the limiting points; to provide a rotary actuator for extending and retracting the landing hook of an aircraft; to provide such a mechanism including power drive means, such as an electric motor, for operating the same; to provide such a mechanism including a novel torque limiting arrangement for effecting deenergization of the power drive means at either extreme position of the landing hook to avoid destruction by impact; to provide such a mechanism including a manually operable device, normally disconnected from the mechanism, but effective upon actuation of the device to be connected to the mechanism to extend the landing hook; to provide such a mechanism including power drive means and manual drive means to permit foolproof extension of the hook, both controllable from a position adjacent the pilot's seat; and to provide a simple reliable arresting gear actuator for an airplane.

These and other objects, advantages and features of the invention will be apparent from the following description and accompanying drawings. In the drawings:

Fig. 2 is a longitudinal sectional view through mechanism embodying the principles of the present invention.

Fig. 5 is a cross-sectional view on the line 5—5 of Fig. 2.

Fig. 6 is a cross-sectional view on the line 6—6 of Fig. 2.

Fig. 7 is a schematic wiring diagram illustrating the electrical connections for controlling the operation of the rotary actuator of the invention.

Figure 1:
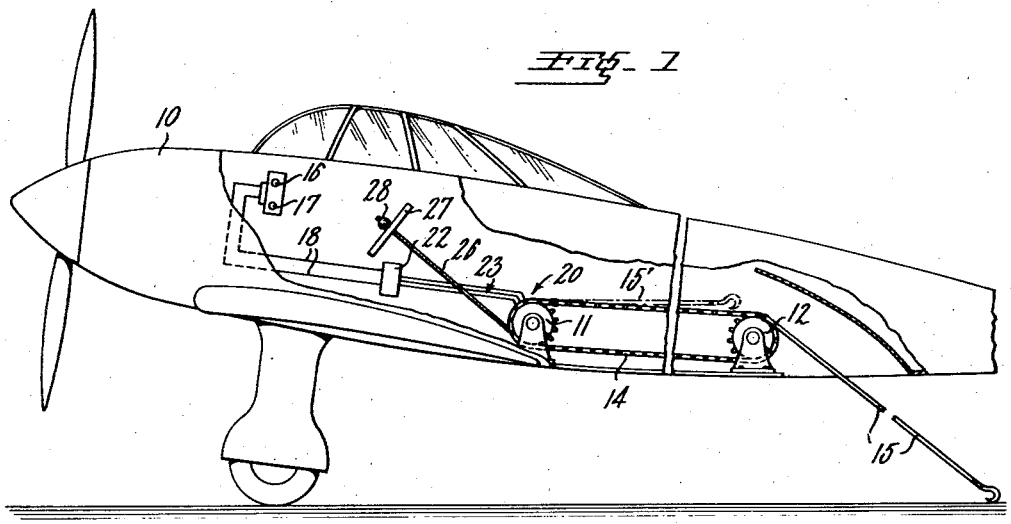
Fig. 1 is a schematic elevation, partly broken away, of an airplane equipped with the hook operating mechanism of the present invention.

Referring to the drawings, and particularly to Fig. 1 thereof, an airplane 10 is shown as equipped with a landing hook shown in the extended position at 15 and in dotted lines in the retracted position at 15'. The mechanism for extending and retracting the hook comprises a pair of sprockets 11 and 12 interconnected by suitable means such as an endless chain 14. A rotary actuator 20, shown more particularly in Figs. 2, 5 and 6, is connected to the sprocket 11. A power drive means is provided for actuator 20, and may be an electric motor which is controlled from a position adjacent the pilot's seat by a pair of push buttons 16 and 17. Conductors 18 connects the push buttons to control box illustrated diagrammatically at 22. Leads 23 connect the control box 22 to the electric motor associated with the actuator.

It is important to provide for manual actuation in the event of failure of the power drive means, to insure lowering of the hook at all times during a landing operation. For this purpose a cable 26 extends from a manual actuating device associated with actuator 20 to a point adjacent the pilot's seat. Cable 26 may extend through a bracket 27 and be provided with a suitable grip 28. Upon actuation of one of the push buttons 16 or 17, hook 15 is either extended or retracted. In the event of failure of the power drive means, the pilot may grasp grip 28 and by pulling the same forwardly and releasing the same a sufficient number of times, may extend hook 15 in a manner to be described more fully hereinafter thus assuring positive lowering of the hook during all landing operations.

Actuator 20 is shown in longitudinal sectional view in Fig. 2. It comprises an electric motor 30 adapted to be connected through electromagnetic clutch 35 to a torque limiting device 40. Torque limiting device 40 is connected through reduction gearing 45 to sprocket 11. A manual driving device 50, which is operated by cable 26, is adapted to be connected to sprocket 11, for extending cable 26, in a manner to be described more fully hereinafter. Electromagnetic clutch 35 may be a quick acting clutch of the type described and claimed in my Patent No. 2,267,114, and torque limiting device 40 may be of the type described and claimed in my copending application Serial No. 499,010.

Clutch 35 includes a driving disk 31 of magnetic material secured to armature shaft 32 of motor 30 and containing a non-magnetic ring 21. A driven disk 33, likewise of magnetic material, is arranged adjacent driving disk 31. A suitable magnetizing winding 34 is provided in the clutch housing, and may be connected in either series or parallel circuit arrangement with motor 30. Upon energization of winding 34, driven disk 33 is simultaneously urged into magnetic and frictional coaction with driving disk 31, so that armature shaft 32 is effective to rotate pinion 36 formed integrally with disk 33. Upon deenergization of winding 34, a spring 37 instantaneously snaps disk 33 into engagement with a braking surface 38, to substantially instantaneously arrest motion of pinion 36 and actuator 20 at the desired position.

Figure 3:
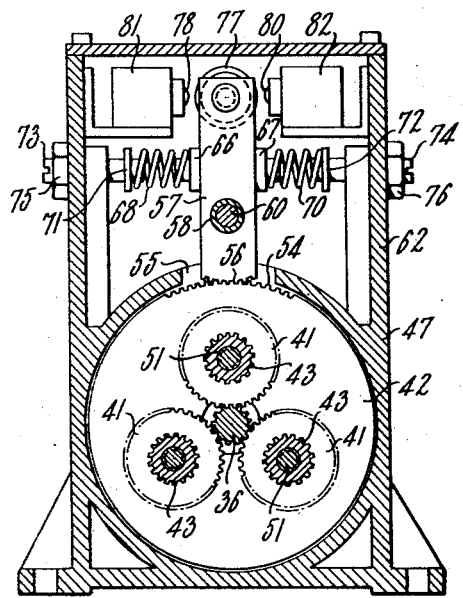
Fig. 3 is a cross-sectional view on the line 3—3 of Fig. 2.
Figure 4:
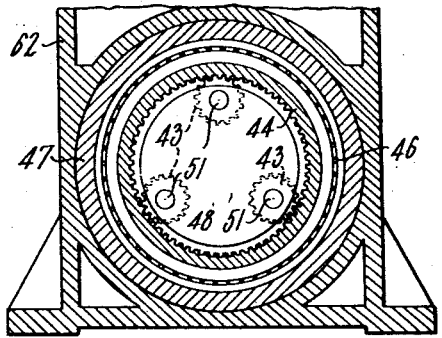
Fig. 4 is a cross-sectional view on the line 4—4 of Fig. 2.

Pinion 36 cooperates with torque limiting device 40. As shown in Figs. 2, 3 and 4, pinion 36 meshes with a plurality of planetary gears 41 rotatably mounted on a movable mounting plate 42. Pinions 43 are secured to gears 41 and mesh with an internal ring gear 44 rotatably mounted on bearings 46 in a housing 47. A plate 48 is provided to support the forward ends of the shafts 51 on which gears 41 and pinions 43 are mounted. Ring gear 44 is provided with a hub 52 terminating in a drive pinion 53.

Referring to Fig. 3, movable mounting member 42 is provided with gear teeth 54 disposed adjacent an opening 55 in housing 47. Teeth 54 mesh with teeth 56 of a sector 57. Sector 57 is mounted on a sleeve 58 disposed on a longitudinally adjustable shaft 60 mounted in one wall 61 of a switch housing 62 secured to housing 47. The opposite end of shaft 60 is mounted in an upstanding ear 63 formed integrally with housing 62. A nut 64 is provided for adjusting shaft 60 longitudinally, the shaft and the sector 57 being urged in one direction by a spring 65 engaging ear 63. Sector 57 is provided with spring seats 66 and 67 which are engaged by springs 68 and 70 respectively. The opposite ends of springs 68 and 70 engage adjustable seats 71 and 72, the position of which may be adjustable by screws 73 and 74 provided with lock nuts 75 and 76. On the upper end of sector 57 is a suitable operating means such as a roller 77 which cooperates with push buttons 78 and 80 of a pair of switches 81 and 82 mounted in housing 62. Leads 23 are brought into housing 62 through an entrance bushing 79.

As explained in my copending application Serial No. 499,010, sector 57 is normally maintained in a position midway between push buttons 78 and 80. Springs 68 and 70 normally restrain movement of the sector and of movable plate 42. However, when the torque upon the driven system exceeds a preselected value, plate 42 and sector 57 are moved in one direction or the other to open one of the switches 81 or 82 and thus deenergize motor 30 and instantaneously declutch the motor armature from the actuator. Adjustment of screws 73 and 74 predetermines the torque required to cause sector 57 to operate switches 81 or 82.

Referring to Fig. 5, drive pinion 53 engages a spur gear 83 to which is secured a pinion 84 meshing with a spur gear 85. Pinion 86 fixed to spur gear 85 meshes with a driving spur gear 87. Gear 87 is keyed to a shaft 88 having a reduced portion 90 mounted in bearings 91 in a housing 92 enclosing the gearing. The opposite end of shaft 88 is mounted in bearings 93 and is provided with a recess 94 for a purpose to be described hereinafter. A collar 96 maintains bearings 93 and spur gear 87 in proper relation. Drive sprocket 11 is keyed to shaft 88.

Upon depression of one of the push buttons 16 or 17, motor 30 and clutch 35 are energized to drive sprocket 11 through torque limiting device 40 and reduction gearing 45. Hook 15 is either extended or retracted, dependent upon which push button is operated. Upon hook 15 reaching either limit of its movement, the torque exerted by motor 30 will be such as to cause movement of plate 42 in one direction or the other. This will accordingly open one of the switches 81 or 82 to deenergize motor 30. Clutch 35 is deenergized simultaneously therewith, whereupon spring 37 snaps disk 33 into engagement with brake surface 38. This substantially instantaneously stops motion of sprocket 11.

The torque limiting device 40 avoids the use of electric limit or stop switches which require skilled and accurate mounting and adjustment. Additionally, it insures foolproof operation of the mechanism with positive stopping thereof at the limits of operation, thus avoiding damage to the apparatus. The electrical disconnection of the motor 30 through the clutch 35, promptly mechanically disconnects the stored rotative energy of the motor armature from the actuator 20 in time to avoid breakage of mechanical components such as gearing by impact due to the hook 15 being drawn past its fully retracted or extended positions.

Should the electrical supply or the motor 30 fail, there is still an urgent need for extending the hook for landing operation. For this reason, the manual operating device 50 is provided to extend the hook. This device is designed to substantially reduce the torque to be supplied by hand for extending the hook. Manual driving device 50 is mounted in a bracket 97 secured to gear housing 92. Device 50 includes a cup-shaped bracket 98 secured to the forward wall of the bracket 97. Bracket 98 supports a shaft 100 having a reduced portion 101 inserted in a sleeve 102 set in recess 94. A bolt 105 and lock nut 106 are provided for proper adjustment of shaft 100. Fitted on shaft 100 with a driving fit is a drum 107 provided with a helical groove 108 adapted to receive cable 26. A spring 110 is secured at one end to drum 107 and at its opposite end to a cup-shaped member 109 secured to bracket 98 by pins 110.

Sprocket 11 is formed with a hub portion 111 provided with ratchet teeth 112. A pawl 113 mounted on drum 107 has an end 114 normally urged toward engagement with teeth 112 by a leaf spring 115. However, spring 110 normally urges drum 107 to a position wherein a roller 116 on the opposite end of pawl 113 is engaged by a cam 117 secured to the upper wall 118 of bracket 97. Cam 117 is provided with a sloping surface 120 which engages roller 116 and forces it against a stop 121. This moves end 114 of pawl 113 out of engagement with teeth 112.

One end of cable 26 extends through an aperture 122 in drum 107 and has secured thereto a stop 123. The other end of the cable extends outwardly from bracket 97 to a position adjacent the pilot's seat, as explained heretofore. When the pilot grasps grip 28 and pulls cable 26 outwardly, drum 107 is rotated and spring 110 is wound up. Such actuation of cable 26 moves the drum in a counter clock-wise direction. Upon the start of such movement, pawl 113 is disengaged from cam 117 and end 114 of the pawl engages teeth 112. This connects drum 107 to sprocket 11 to move chain 14 in a direction to extend hook 15. After a little less than one revolution, pawl 113 engages the opposite side of cam 117, stopping rotation of the drum. The pilot then releases cable 26 and spring 110 rotates drum 107 back to its original position. During such reverse rotation, pawl 113 slides over teeth 112 leaving the sprocket 11 in its operated position. The pilot again grasps grip 28 and pulls cable 26 outwardly. This operation is repeated until such time as hook 15 is fully extended.

A preferred control circuit arrangement for the device of the present invention is schematically illustrated in Fig. 7. As shown in this figure, motor 30 is adapted to be energized through the medium of push buttons 16 and 17. Of these push button 16 may be considered the "in" button, and push button 17 the "out" button. Upon depression of button 16, its contacts close a circuit through a relay 125. Relay 125, through its upper armature 126, closes a circuit for motor 30 through torque limit switch 82 and motor field winding 127. Field 127 is so arranged that it will cause motor 30 to operate in a direction to retract hook 15 into the fuselage of aircraft 10. When the hook has been fully retracted into the aircraft, the increased torque exerted upon the motor will cause arm 57 to contact push button 80 and thus open switch 82. Push button 16 need be depressed only momentarily, as relay 125 completes a holding circuit through its lower armature 128.

Depression of "out" push button 17 energizes a relay 130 which attracts its armature 131 to energize motor 30 through field winding 132, in such a direction as to cause hook 15 to be extended. At the same time, relay 130 closes a holding circuit for itself through its armature 133. A warning light 135 is lighted to indicate extension of hook 15. Motor 30 continues to operate until the hook is substantially fully extended. At such time, the increased torque exerted on the motor will cause arm 57 to move its roller 77 into engagement with push button 78. This will move switch 81 to a position opening the circuit through motor 30. At the same time, switch 81 will engage a contact 134 closing a parallel circuit for maintaining lighted a warning light 135 which indicates to the pilot that the hook is extended.

While a specific embodiment of the invention has been shown and described for the purpose of illustrating the application of the principles thereof, it will be obvious to those skilled in the art that the invention may be otherwise embodied without departing from such principles.

What is claimed is:

1. Extending and retracting mechanism comprising in combination a movable member; an actuator operatively associated with said movable member for extending and retracting the same; a ratchet secured to said actuator; power drive means; a torque limiting device connected to said actuator; means effective upon energization of said power drive means to connect the same to said torque limiting device to extend or retract said movable member, said torque limiting device having circuit means effective to deenergize said power drive means when the torque on said actuator exceeds a preselected value; a reel; a bracket supporting said reel; a cable secured to said reel to rotate the same in one direction; a grip secured to said cable; means urging said reel to rotate in the opposite direction to rewind said cable thereon; means urging said pawl into engagement with said ratchet to interconnect said reel and said actuator; and a cam secured to said bracket and adapted to engage said pawl to release the same from said ratchet when said cable is rewound on said reel.

2. Extending and retracting mechanism comprising in combination a movable member; an actuator operatively associated with said movable member for extending and retracting the same; a ratchet secured to said actuator; an electric motor; a torque limiting device connected to said actuator; means effective upon energization of said electric motor to connect the same to said torque limiting device to extend or retract said movable member, said torque limiting device having circuit means effective to deenergize said electric motor when the torque on said actuator exceeds a preselected value; a reel; a bracket supporting said reel; a cable secured to said reel to rotate the same in one direction; a grip secured to said cable; means urging said reel to rotate in the opposite direction to rewind said cable thereon; means urging said pawl into engagement with said ratchet to interconnect said reel and said actuator; and a cam secured to said bracket and adapted to engage said pawl to release the same from said ratchet when said cable is rewound on said reel.

3. Extending and retracting mechanism comprising in combination a movable member; an actuator operatively associated with said movable member for extending and retracting the same; a ratchet secured to said actuator; an electric motor; a torque limiting device connected to said actuator; electromagnetic clutch means effective upon energization of said electric motor to connect the same to said torque limiting device to extend or retract said movable member, said torque limiting device having circuit means effective to deenergize said electric motor when the torque on said actuator exceeds a preselected value; a reel; a bracket supporting said reel; a cable secured to said reel to rotate the same in one direction; a grip secured to said cable; means urging said reel to rotate in the opposite direction to rewind said cable thereon; means urging said pawl into engagement with said ratchet to interconnect said reel and said actuator; and a cam secured to said bracket and adapted to engage said pawl to release the same from said ratchet when said cable is rewound on said reel.

4. An aircraft arresting gear operator comprising, in combination, a pair of sprockets; mechanism interconnecting said sprockets; arresting gear secured to said mechanism; a torque limiting device connected to one of said sprockets; a ratchet secured to said one sprocket; power drive means; clutch means effective upon energization of said power drive means to connect the same to said torque limiting device to extend or retract said arresting gear; a reel; a bracket supporting said reel; a cable secured to said reel to rotate the same in one direction; a grip secured to said cable; means urging said reel to rotate in the opposite direction to rewind said cable thereon; means urging said pawl into engagement with said ratchet to interconnect said reel and said one sprocket; and a cam secured to said bracket and adapted to engage said pawl to release the same from said ratchet when said cable is rewound on said reel.

5. An aircraft landing hook operator comprising, in combination, a pair of sprockets; endless means interconnecting said sprockets; a landing hook secured to said endless means; a torque limiting device connected to one of said sprockets; a ratchet secured to said sprocket; an electric motor; electromagnetic clutch means effective upon energization of said electric motor to connect the same to said torque limiting device to extend or retract said landing hook; a reel; a bracket supporting said reel; a cable secured to said reel to rotate the same in one direction; a grip secured to said cable; means urging said reel to rotate in the opposite direction to rewind said cable thereon; means urging said pawl into engagement with said ratchet to interconnect said reel and said one sprocket; and a cam secured to said bracket and adapted to engage said pawl to release the same from said ratchet when said cable is rewound on said reel.

6. An aircraft landing hook operator comprising, in combination, a pair of sprockets; a chain interconnecting said sprockets; a landing hook secured to said chain; a ratchet secured to one of said sprockets; reduction gearing connected to said one sprocket; an electric motor; planetary gearing, said planetary gearing including an element coupled to said reduction gearing, a movable mounting plate and an element adapted to be coupled to said electric motor; an electromagnetic clutch effective upon energization of said electric motor to connect the same to said last named element to extend or retract said landing hook; a pair of switches interposed in the circuit of said electric motor; an actuating member disposed in operative relation with said switches, said actuating member being operable by said mounting plate to selectively open said switches to deenergize said electric motor and clutch when the torque of said motor exceeds a preselected value; means normally restraining movement of said mounting plate and said actuating member; a reel; a bracket supporting said reel; a cable secured to said reel to rotate the same in one direction; a grip secured to said cable; means urging said reel to rotate in the opposite direction to rewind said cable thereon; a pawl mounted on said reel adjacent said ratchet; means urging said pawl into engagement with said ratchet to interconnect said reel and said one sprocket; and a cam secured to said bracket and adapted to engage said pawl to release the same from said ratchet when said cable is rewound on said reel.

7. In combination, an aircraft having a fuselage; a landing hook adapted to be extended from and retracted into said fuselage; a first sprocket located adjacent the midsection of said fuselage; a second sprocket located adjacent the rear section of said fuselage; an endless chain engaging said sprockets; means securing said hook to said chain; a ratchet secured to said first sprocket; an electric motor; a torque limiting device connected to said first sprocket; clutch means effective upon energization of said electric motor to connect the same to said torque limiting device to extend or retract said landing hook; a reel; a bracket supporting said reel; a cable secured to said reel to rotate the same in one direction; a grip secured to said cable; means urging said reel to rotate in the opposite direction to rewind said cable thereon; means urging said pawl into engagement with said ratchet to interconnect said reel and said first sprocket; and a cam secured to said bracket and adapted to engage said pawl to release the same from said ratchet when said cable is rewound on said reel.

8. In combination, an aircraft having a fuselage; a landing hook adapted to be extended from and retracted into said fuselage; a first sprocket located adjacent the mid-section of said fuselage; a second sprocket located adjacent the rear section of said fuselage; an endless chain engaging said sprockets; means securing said hook to said chain; an electric motor; a torque limiting device connected to said first sprocket; clutch means effective upon energization of said electric motor to connect the same to said torque limiting device to extend or retract said landing hook; a reel; a bracket supporting said reel; a cable secured to said reel to rotate the same in one direction; a grip secured to said cable; means urging said reel to rotate in the opposite direction to rewind said cable thereon; a ratchet secured to said first sprocket; a pawl mounted on said reel adjacent said ratchet; means urging said pawl into engagement with said ratchet to interconnect said reel and said one sprocket; and a cam secured to said bracket and adapted to engage said pawl to disengage the same from said ratchet.

9. In combination, an aircraft having a fuselage; a landing hook adapted to be extended from and retracted into said fuselage; a first sprocket located adjacent the mid-section of said fuselage; a second sprocket located adjacent the rear section of said fuselage; an endless chain engaging said sprockets; an electric motor; reduction gearing connected to said one sprocket; planetary gearing, said planetary gearing including an element coupled to said reduction gearing, a movable mounting plate and an element adapted to be coupled to said electric motor; means effective upon energization of said electric motor to connect said motor to said last named element; a pair of switches interposed in the circuit of said electric motor; an actuating member disposed in operative relation with said switches, said actuating member being operable by said mounting plate to selectively open said switches to deenergize said electric motor when the torque of said motor exceeds a preselected value; means normally restraining movement of said mounting plate and said actuating member; a reel; a bracket supporting said reel; a cable secured to said reel to rotate the same in one direction; a grip secured to said cable; means urging said reel to rotate in the opposite direction to rewind said cable thereon; a ratchet secured to said first sprocket; a pawl mounted on said reel adjacent said ratchet; means urging said pawl into engagement with said ratchet to interconnect said reel and said one sprocket; and a cam secured to said bracket and adapted to engage said pawl to disengage the same from said ratchet.

WILLIAM P. LEAR.